UNITED STATES PATENT OFFICE.

F. J. DE CAVAILLON, OF PARIS, FRANCE.

IMPROVEMENT IN PURIFYING ILLUMINATING-GAS.

Specification forming part of Letters Patent No. 8,081, dated May 6, 1851.

*To all whom it may concern:*

Be it known that I, FLORENTIN JOSEPH DE CAVAILLON, of the city of Paris, France, have discovered certain new and useful Improvements in the Manufacture of Illuminating-Gases; and I do hereby declare the following to be a full, clear, and exact description of the same.

My invention consists in the preparation of purifiers for illuminating-gas, whereby I am enabled greatly to reduce the cost of purification as conducted on the old plan by a considerable diminution in consumption of lime.

My purifiers, although intended for gas produced entirely from pit-coal, are equally applicable to gases derived from other substances, or substances combined with pit-coal in the retorts, as follows: the offal of kitchens in the form of animal waste—as bones, grease, &c.—the oleaginous residuum of seeds, also spent bark, sawdust, or pulverized wood that has been employed in the purification of oils, also peat or turf. The above or either of them, when mixed with fifty per cent. of pit-coal by grinding, and combined so as to form a compact mass by the aid of some gummy or resinous matters or empyreumatic oil, or the molasses of sugar, are properly introduced in retorts of common construction and the distillation effected in the usual manner. The products of such a composition are as follows: first, a very fine carbureted hydrogen gas of high illuminating power; second, animal charcoal; third, animal and vegetable charcoal in powder, (this product may be employed for various purposes, such as for preparation of manure;) fourth, empyreumatic oil mixed with tar; fifth, very rich ammoniacal water.

The purifying materials which I use may be divided into three elements, viz: substances which are natural purifiers, substances which have been made purifiers, and substances which are inert. The substances which are purifiers naturally are sulphate of lime, pulverized vegetable carbon or charcoal, animal charcoal, the sulphate and the oxide of lead. The substance which is artificially made a purifier is sawdust, which, although in its natural state inert, becomes a purifier by damping it with from seven to eight per cent. of sulphuric acid. The inert substances are sawdust without sulphuric acid, pulverized peat, pulverized spent bark or tannin, sand, and pounded coke. Sulphate of lime is the principal ingredient I use, and it forms the base of the mixture now to be described, the greater part of which consists of this substance in the form commonly known as "plaster." I prefer to use old plaster which has once been employed for building or other purposes, although I do not confine myself to the sulphate of lime artificially made. That found in nature will also answer. I therefore intend to include in the preparation of my purifying-powder any artificial or natural sulphate of lime without reference to their origin or from whatever process they may have been obtained. I have found that a preference is to be given to those sulphates which are derived from the manufacture of stearine candles, and also those sulphates obtained from the process of purifying oils or other substances which in their preparation or manufacture gives as one of their products artificial sulphates of lime. The second material is coke pulverized and sifted and river or other sand not too fine. The third is pulverized vegetable charcoal; fourth, pulverized animal charcoal; fifth, sawdust; sixth, pulverized peat or turf; seventh, spent bark (tannin) reduced to powder; eighth, sulphate of lead mixed with oxide of lead; ninth, sulphate and oxide of iron; tenth, the carbonate of lime.

As the situation of the works and other circumstances may render it difficult to obtain a regular supply of all the materials above mentioned, I do not think it advisable to state any precise quantities or proportions in which the said materials, commencing with coke, &c., are to be mixed with the sulphate of lime for the preparation or composition of the purifying-powder, as it may sometimes be found convenient to increase the proportions of some or diminish the quantity of others, or in some cases to omit some of them altogether, which may be done without detriment, provided the proper proportion between them and the sulphate of lime is retained.

The purifying-powder should be compounded in such a manner that about seventy per cent. in volume of the mixture should consist of sulphate of lime. Of the remaining thirty per cent. about one-third should be composed of either of the above-mentioned purifying ingredients, and the balance from the inert matters—such as coke, sawdust, &c.—or the whole thirty per cent. may be composed of the above-mentioned inert substances.

The powder is prepared as follows: Take a quantity of sulphate of lime, artificially produced, if it can be had, and then select from the above-mentioned ingredients as many as can be conveniently procured to the amount of thirty per cent. or the bulk of the sulphate of lime, as before stated. The whole is then to be reduced to a powder and thoroughly mixed together, which done, the mass must be wetted with dilute sulphuric acid, or acidulated water weighing from six to seven degrees of Baumé's acid-weighing apparatus. This wetting operation should be conducted in a similar manner to that adopted for adding common water to the lime which is usually employed for purifying gas containing sulphureted hydrogen.

I would here remark that if the sulphate of lime which is to be employed in the purifying-powder is artificial, then it will not be necessary to add any sulphuric acid; but it will be always necessary to wet the mass, which may be done with common water.

The purifying-powder thus prepared must be placed upon the sieves or perforated shelves of the purifiers, and if the perforated shelves of the purifiers are made of metal, then it will be advisable to cover them with moss, hay, straw, or some other suitable material before placing the purifying materials thereon, in order that the holes in the shelves may not be stopped up by the purifying materials; but if the shelves are made of wicker-work, this precaution will be unnecessary. The powder thus prepared is to be used in connection with lime, as at present, and the quantity employed may be varied to suit different circumstances. In the gas-works in France in which my process has been adopted it has been used in the proportion of two-thirds of the powder for one-third of lime, thus effecting a saving of two-thirds of the lime as compared with the old process. The purifying-powder will take up the ammonia, and will also partially neutralize the sulphureted hydrogen and give to the gas a brilliancy and illuminating-power superior to that obtained by the process now in use.

It is scarcely necessary to say that when the purifying-powder is entirely saturated with ammonia, which will be easily ascertained by exposing to the current of gas some turmeric test-paper, its properties will have been exhausted, and it must be renewed by the introduction of a fresh lot. The same may be said of the lime when found exhausted by the usual tests.

It should be remarked that the purifying-powder should always be placed upon the perforated shelves, trays, or sieves of the purifiers in such a manner that the current of gas to be purified may pass through it before arriving at the lime. Therefore, if the current of gas is made to ascend, the purifying-powder must be placed first upon the perforated shelves of the purifier and then covered with the lime. If the current of gas is made to descend, the lime must be placed first upon the shelves and covered with the purifying-powder.

What I claim as of my own invention and discovery, and desire to secure by Letters Patent of the United States, is—

The purifying-powder for illuminating-gas, said powder consisting of sulphate of lime, either natural or artificial, in connection with some inert substance or substances partly inert and partly rendered purifiers, when compounded in the proportions substantially as described herein.

FLORENTIN JOSEPH DE CAVAILLON.

Witnesses:
JOHN BARTLY,
F. PAYEN.